United States Patent
Fukuta et al.

(10) Patent No.: US 6,811,737 B2
(45) Date of Patent: Nov. 2, 2004

(54) METHOD OF MANUFACTURING CERAMIC BODIES

(75) Inventors: Ken Fukuta, Nagoya (JP); Akio Enomoto, Nagoya (JP); Eiji Ito, Nagoya (JP)

(73) Assignee: NGK Insulators, Ltd. (JP)

(*) Notice: Subject to any disclaimer, the term of this patent is extended or adjusted under 35 U.S.C. 154(b) by 0 days.

(21) Appl. No.: 10/084,658

(22) Filed: Feb. 28, 2002

(65) Prior Publication Data

US 2003/0160366 A1 Aug. 28, 2003

(51) Int. Cl.⁷ ................................................ H05B 6/00
(52) U.S. Cl. .................. 264/482; 264/40.1; 264/267; 264/629
(58) Field of Search .............................. 264/482, 629, 264/400, 40.1, 40.7, 267

(56) References Cited

U.S. PATENT DOCUMENTS 4,557,773 A * 12/1985 Bonzo
4,559,193 A * 12/1985 Ogawa et al.

2002/0020944 A1   2/2002  Yamaguchi et al. ........ 264/400

FOREIGN PATENT DOCUMENTS

| DE | 101 22 939 A1 | 5/2001 |
|---|---|---|
| JP | 2001-300922 | 10/2001 |
| JP | 2001300922 A | 10/2001 |
| JP | 2002-28915 | 1/2002 |
| JP | 2002028915 A | 1/2002 |

* cited by examiner

Primary Examiner—Christopher A. Fiorilla
(74) Attorney, Agent, or Firm—Parkhurst & Wendel, L.L.P.

(57) ABSTRACT

A method of manufacturing ceramic bodies having a construction such that cells are alternately sealed at one but not both end surfaces of a ceramic honeycomb structural body by filling a sealing slurry into predetermined cells at both end surfaces of a ceramic honeycomb formed body and sintering the ceramic honeycomb formed body, is performed by: forming a mask for respective ceramic honeycomb formed bodies by arranging a sheet on an end surface of the ceramic honeycomb formed body and piercing holes in the sheet at positions corresponding to the predetermined cells; immersing an end portion of the ceramic honeycomb formed body to which the mask is arranged into the sealing slurry; and filling the sealing slurry into the cells through the holes pierced in the mask.

5 Claims, 5 Drawing Sheets

A-A CROSS SECTION

METHOD OF MANUFACTURING CERAMIC BODIES

BACKGROUND OF THE INVENTION (1) Field of the Invention

The present invention relates to a method of manufacturing ceramic bodies having a construction such that cells are alternately sealed at one but not both end surfaces of a ceramic honeycomb structural body.

(2) Prior Art Statement

Generally, various methods of manufacturing the ceramic bodies having the construction such that the cells are alternately sealed at one but not both end surfaces of the ceramic honeycomb structural body have been known. FIGS. 5a–5c are schematic views respectively explaining one embodiment of the known method of manufacturing the ceramic bodies. According to FIGS. 5a–5c, the known method of manufacturing the ceramic bodies will be explained. At first, as shown in FIG. 5a, a rubber mask 54 having holes 53 pierced at portions corresponding to cells 52 to be sealed is prepared, and then the mask 54 is set manually to an end surface of a ceramic honeycomb formed body 51 (ceramic honeycomb structural body before sintering).

Then, as shown in FIG. 5b, the end surface of the ceramic honeycomb formed body 51, to which the mask 54 is arranged, is immersed into a sealing slurry 55 by applying a pressure to the ceramic honeycomb formed body 51 from the upside. Thereby, the slurry 55 is filled into the cells 52 through the holes 53 of the mask 54. The same process is performed with respect to the other end surface of the ceramic honeycomb formed body 51 so as to fill the slurry 55 into the cells 52. In this case, in order to obtain a construction such that the cells 52 are alternately sealed at one but not both of the end surfaces, use is made of the another mask 54 having holes 53 pierced oppositely with respect to the holes 53 of the mask 54 used for the one end surface mentioned above. Then, as shown in FIG. 5c by a cross section, it is possible to obtain the ceramic honeycomb formed body 51 having the construction such that the cells 52 are alternately sealed at one but not both of the end surfaces of the ceramic honeycomb formed body 51. Finally, the thus obtained ceramic honeycomb formed body 51 is sintered so as to obtain a target ceramic body.

However, in the known method of manufacturing the ceramic body mentioned above, there are drawbacks such that it is difficult to make the mask 54 having the holes 53 at predetermined positions and to set precisely the mask 54 to the end surface of the ceramic honeycomb formed body 51. Particularly, in a large size ceramic body required recently having a diameter of 300 mm for example, the number of the cells 52 becomes several ten thousands, and thus the drawbacks mentioned above become further difficult. Moreover, since the mask 54 is set manually to the end surface of the ceramic honeycomb formed body 51, workers need experience for such a process, time is necessary for this process, and it is not possible to perform automatic processing. Further, it is necessary to clean up the mask 54 after end of work so as to reuse the mask 54, but, since the mask 54 has enormous cells 52, there is a drawback such that it is very troublesome to clean up the mask 54.

SUMMARY OF THE INVENTION

An object of the present invention is to eliminate the drawbacks mentioned above and to provide a method of manufacturing ceramic bodies wherein the cells can be easily sealed at the end surface and it is easy to achieve an automation process.

According to the invention, a method of manufacturing ceramic bodies having a construction such that cells are alternately sealed at one but not both end surfaces of a ceramic honeycomb structural body by filling a sealing slurry into predetermined cells at both end surfaces of a ceramic honeycomb formed body and sintering the ceramic honeycomb formed body, comprises the steps of: forming a mask for respective ceramic honeycomb formed bodies by arranging a sheet on an end surface of the ceramic honeycomb formed body and piercing holes in the sheet at positions corresponding to the predetermined cells; immersing an end portion of the ceramic honeycomb formed body to which the mask is arranged into the sealing slurry; and filling the sealing slurry into the cells through the holes pierced in the mask.

In the present invention, since use is made of the disposable sheet to which the predetermined holes are pierced every sealing processes instead of the mask, it is possible to reduce a mask making process and a mask setting process for the end surface of the ceramic honeycomb formed body. Moreover, it is possible to perform a cell position detecting process by means of an image processing and also it is possible to perform a hole piercing process in the sheet by means of a laser processing. Therefore, it is possible to realize an automation.

As a preferred embodiment, the piercing step to the sheet arranged at the end surface of the ceramic honeycomb formed body is performed respectively for sub-blocks obtained by dividing the cells at the end surface into sub regions. With respect to the end surface of the large size ceramic honeycomb formed body having for example a diameter of 300 mm, if the hole piercing process for all the cells is performed with reference to one standard cell pitch obtained for particular few cells, the cell pitch is deformed due to changes of drying states, material lots and forming conditions. In this case, an error over one cell with respect to a normal hole piercing position occurs. Moreover, in the case that the hole piercing process is performed by detecting all the positions of the cells at once and by piercing all the holes every time its position is corrected by calculating a distance from a center, it takes a lot of time for a data transmission and a position correcting calculation for all the cells if use is made of an image processing technique, a laser processing technique and a computer for data processing. If the hole piercing process is performed for every sub-block, deformations of the cell shape and the cell pitch are small in the sub-block region. Therefore, an error is within one cell even if the hole piercing process is performed with reference to one standard cell pitch obtained for particular few cells. Moreover, since the number of the position correcting calculations can be reduced, it is possible to reduce a time required for the position correcting calculations. Further, as a preferred embodiment, a diameter of the hole pierced in the sheet is set in such a manner that the hole has an area of 30–70% of an area of respective cells. In this embodiment, if a slight cell pitch variation occurs in the sub-blocks, it is free from care that the hole is made to a cell wall or adjacent cells since a diameter of the hole is small with respect to the cell.

BRIEF DESCRIPTION OF THE DRAWINGS

For a better understanding of the present invention, explanations are made to the drawings wherein.

DESCRIPTION OF THE PREFERRED EMBODIMENT

FIGS. 1 to 4a–4c are schematic views respectively showing processes of a method of manufacturing ceramic bodies according to the invention in a processing order. Hereinafter, an explanation is performed with reference to FIGS. 1 to 4a–4c. At first, a ceramic honeycomb formed body 1 (ceramic honeycomb structural body before sintering) is prepared. As the ceramic honeycomb formed body 1, use may be preferably made of a known cordierite ceramic honeycomb formed body. The ceramic honeycomb formed body 1 can be manufactured by mixing raw materials to obtain a mixture and extruding the mixture by means of a die. This is the same method as that of the known one.

Figure 1:
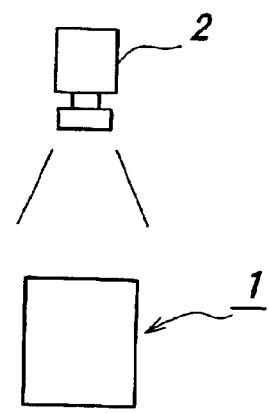
FIG. 1 is a schematic view showing one process of a method of manufacturing ceramic bodies according to the invention.
Figure 2A:
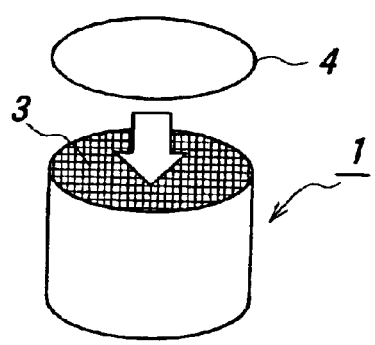
FIGS. 2a and 2b are schematic views respectively illustrating another process of the method of manufacturing the ceramic bodies according to the invention.
Figure 2B:
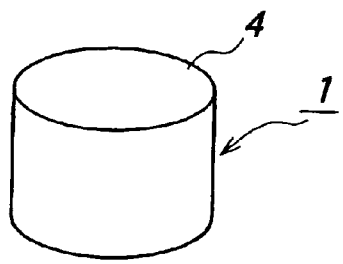

Then, as shown in FIG. 1, one end surface of the thus prepared ceramic honeycomb formed body 1 is picked up by a camera 2 and the thus picked up image is processed by the image processing method so as to detect the positions of all the cells 3 at the end surface. Then, as shown in FIG. 2a, a sheet 4 having a size substantially same as that of the end surface of the ceramic honeycomb formed body 1 is prepared, and, as shown in FIG. 2b, the sheet 4 is adhered to the overall end surface whose cell positions are detected as mentioned above. As the sheet 4, use is made of a commercially available adhesive sheet.

Figure 3A:
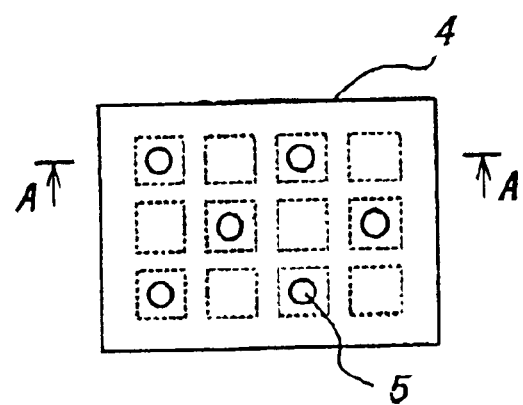
FIGS. 3a and 3b are schematic views respectively depicting still another process of the method of manufacturing the ceramic bodies according to the invention.
Figure 3B:
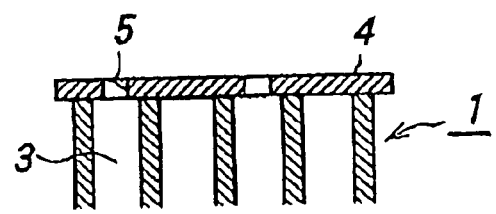

Then, as shown in FIGS. 3a and 3b, a reference position of the sub-block defined by specifications such as outer diameter of the ceramic honeycomb formed body and cell pitch is calculated on the basis of the cell positions detected by the image processing method. Then, an XYZθ stage, on which the ceramic honeycomb formed body 1 is arranged, is positioned, and the holes 5 are pierced into the sheet 4 at positions to which the cells 3 are to be formed by means of a laser processing and so on. The sheet 4 having the holes 5 is used as the mask. It is preferred that a diameter of the hole 5 pierced in the sheet 4 is set in such a manner that the hole 5 has an area of 30–70% more preferably about 50% of an area of respective cells 3. Moreover, the hole 5 has a circular shape, and it is not necessary to pierce the hole 5 in the same shape as that of the cell 3 (rectangular shape). Therefore, since a cell pitch is slightly varied at the end surface, and, since a diameter of the hole 5 is small with respect to the cell 3, there is no fear that the hole 5 is pierced to the cell wall or to the adjacent cell by accident. In this case, it is preferred to select a diameter of the hole 5 corresponding to a viscosity of the slurry used for sealing in such a manner that the diameter is made smaller if the viscosity is low and the diameter is made larger if the viscosity is high. Moreover, the hole piercing process with respect to the sheet 4 mentioned above can be performed for the entire end surface at once. However, it is preferred to perform this process for the sub-blocks respectively after dividing the cells 3 at the end surface into a plurality of sub-blocks. If the hole piercing process is performed every sub-blocks, it is possible to perform this process precisely since variations of cell shape and cell pitch are not varied so much in this sub-block.

Figures 4A, 4B, 4C:
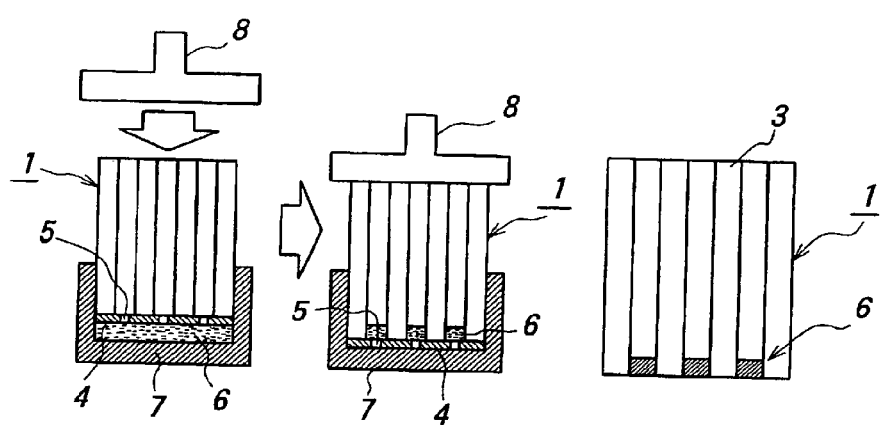
FIGS. 4a–4c are schematic views respectively showing still another process of the method of manufacturing the ceramic bodies according to the invention.
Figure 5A:
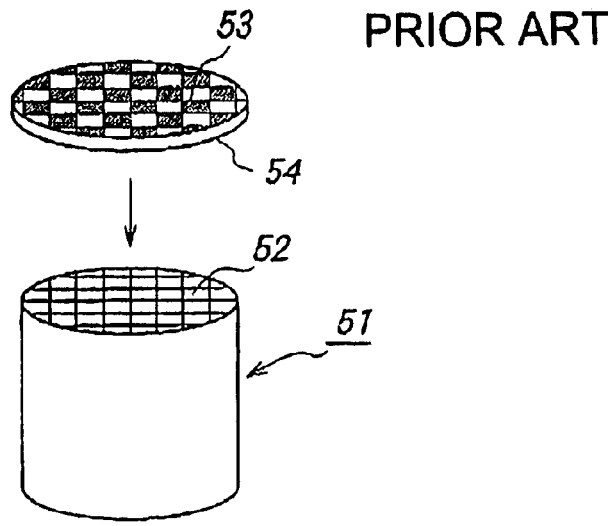
FIGS. 5a–5c are schematic views for explaining one embodiment of the known method of manufacturing the ceramic bodies.
Figure 5B:
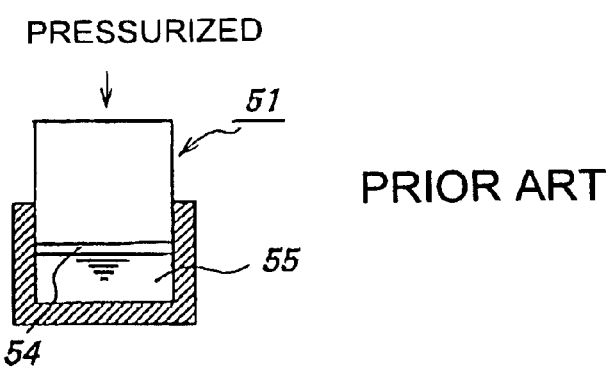
Figure 5C:
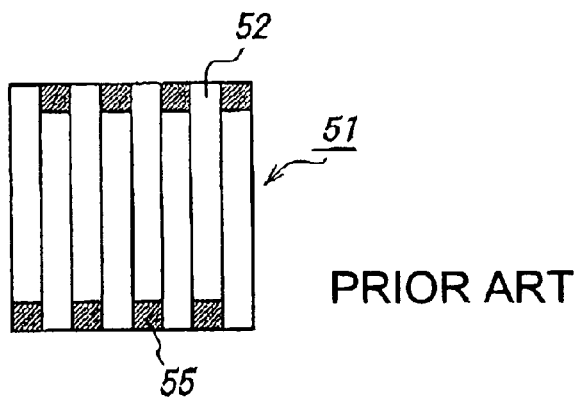
Figure 7:
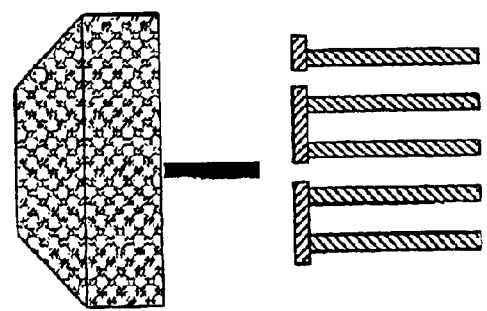
FIG. 7 is a schematic view of a pinholder having needles being used to make holes for cells.
Figure 6:
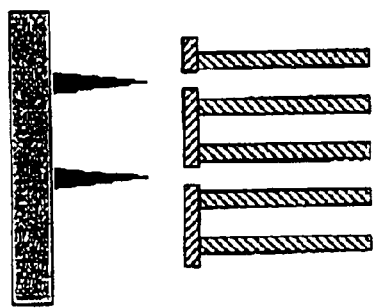
FIG. 6 is a schematic view of a laser being used to make holes for cells.

Then, as shown in FIGS. 4a–4c, a sealing slurry 6 is filled into the cells 3 through the holes 5 pierced in the sheet 4. That is, as shown in FIG. 4a at first, the end surface, to which the sheet 4 having the holes 5 is adhered, is immersed into the slurry 6 in a container 7. Then, as shown in FIG. 4b, the slurry 6 is filled with pressure into the cells 3 through the holes 5 in the sheet 4 by pressing the ceramic honeycomb formed body 1 by means of a pressure applying member 8. After that, as shown in FIG. 4c, the sheet 4 is peeled from the end surface. In this manner, the cell sealing process is finished.

After that, the same cell sealing process is performed at the other end surface, and then the ceramic honeycomb formed body 1 in which predetermined cells 3 are filled with the slurry 6 at both end surfaces is obtained. Finally, a target ceramic body having the construction such that both end surfaces of the ceramic honeycomb structural body are alternately sealed can be obtained by sintering the ceramic honeycomb formed body 1 in which predetermined alternate cells 3 are filled with the slurry 6 at one but not both end surfaces. Such ceramic bodies are mainly used as DPF (Diesel Particulate Filter) for removing graphite components and the like from diesel engine as exhausts.

In the embodiments mentioned above, the hole piercing process for the sheet which is adhered to the end surface of the ceramic honeycomb formed body is performed by using a laser. However, it is possible to perform this process by using a needle or a pinholder having needles at positions corresponding to the cells to be sealed of the ceramic honeycomb formed body. Moreover, in this case, if the needle is heated, it is possible to perform the hole piercing process for the sheet easily, and thus it is a preferred embodiment.

As clearly understood from the above explanations, according to the invention, since use is made of the disposable sheet into which the predetermined holes are pierced by sealing processes instead of a mask, it is possible to reduce a mask-making process and a mask-setting process for the end surface of the ceramic honeycomb formed body. Moreover, it is possible to perform a cell position detecting process by means of an image processing, and also it is possible to perform a hole piercing process in the sheet by means of a laser processing. Therefore, it is possible to realize automation.

What is claimed is:

1. A method of manufacturing a ceramic honeycomb body so constructed that cells are alternately sealed at one but not both end surfaces of the body by filling a sealing slurry into predetermined cells at both end surfaces of a ceramic honeycomb formed body and sintering the ceramic honeycomb formed body, comprising the steps of:

forming a mask for respective ceramic honeycomb formed bodies by arranging a sheet on an end surface of the ceramic honeycomb formed body and piercing holes in the sheet at positions corresponding to the predetermined cells;

immersing an end portion of the ceramic honeycomb formed body to which the mask is arranged into the sealing slurry; and filling the sealing slurry into the cells through the holes pierced in the mask in a quantity sufficient to seal the filled cells, wherein the piercing step of the sheet arranged at the end surface of the ceramic honeycomb formed body is performed respectively for sub-blocks obtained by dividing the cells at the end surface into sub regions.

2. The method of manufacturing ceramic bodies according to claim 1, wherein the piercing step of the sheet arranged at the end surface of the ceramic honeycomb formed body is performed by using a laser.

3. The method of manufacturing ceramic bodies according to claim 1, wherein a diameter of the hole pierced in the sheet is set in such a manner that the hole has an area of 30–70% of an area of respective cells.

4. The method of manufacturing ceramic bodies according to claim 1, wherein positions of the cells are detected by means of an image processing process.

5. The method of manufacturing ceramic bodies according to claim 1, wherein the piercing step of the sheet arranged at the end surface of the ceramic honeycomb formed body is performed by using one needle or a pinholder having needles at positions corresponding to the cells to be sealed of the ceramic honeycomb formed body.

* * * * *